United States Patent

Kawanami et al.

[11] Patent Number: 5,125,055
[45] Date of Patent: Jun. 23, 1992

[54] MULTIPLE OPTICAL FIBER CONNECTOR TERMINAL AND METHOD OF MAKING SAME

[75] Inventors: Norihide Kawanami; Kinjiro Okada, both of Tokyo; Yoshikazu Kozu, Ueda, all of Japan

[73] Assignee: Hirose Electric Co., Ltd., Tokyo, Japan

[21] Appl. No.: 659,092

[22] Filed: Feb. 22, 1991

[30] Foreign Application Priority Data

May 16, 1991 [JP] Japan .................................. 2-124017

[51] Int. Cl.⁵ .............................................. G02B 6/32
[52] U.S. Cl. ........................................ 385/58; 385/64; 385/82
[58] Field of Search ............... 350/96.20, 96.21, 96.22, 350/96.23; 385/58, 64, 82

[56] References Cited

U.S. PATENT DOCUMENTS

| | | | |
|---|---|---|---|
| 4,380,366 | 4/1983 | Franken et al. | 350/96.21 |
| 4,460,243 | 7/1984 | Strait, Jr. | 350/96.20 X |
| 4,490,007 | 12/1984 | Murata | 350/96.20 |
| 4,696,537 | 9/1987 | Bauer et al. | 350/96.21 X |
| 4,773,725 | 9/1988 | Ashman et al. | 350/96.21 X |
| 4,923,268 | 5/1990 | Xu | 350/96.20 X |
| 4,927,229 | 5/1990 | Tanaka et al. | 350/96.20 X |

Primary Examiner—Akm E. Ullah
Assistant Examiner—Phan T. Heartney
Attorney, Agent, or Firm—Kanesaka & Takeuchi

[57] ABSTRACT

A multiple optical fiber connector terminal includes a sleeve (6); a plurality of pins (7) disposed within the sleeve to form a plurality of receiving apertures (9); a plurality of filler rods (8) disposed between the sleeve and the pins; and a plurality of optical fibers (10) inserted into and bonded to the receiving apertures.

30 Claims, 5 Drawing Sheets

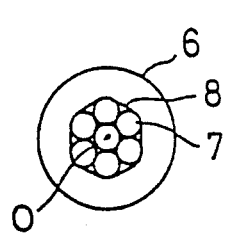
FIG. 11
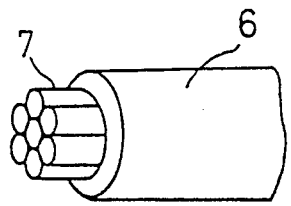
FIG. 12
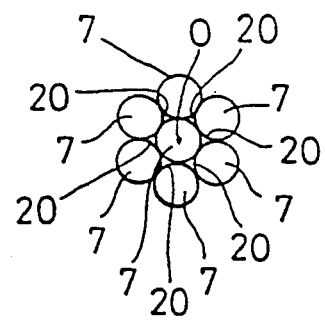
FIG. 13
FIG. 14
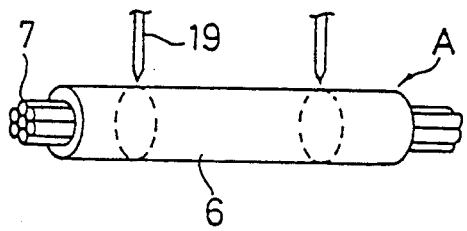
FIG. 15
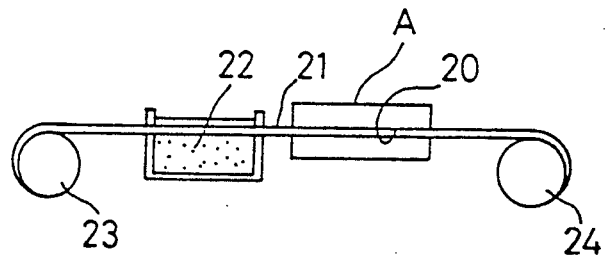
FIG. 16
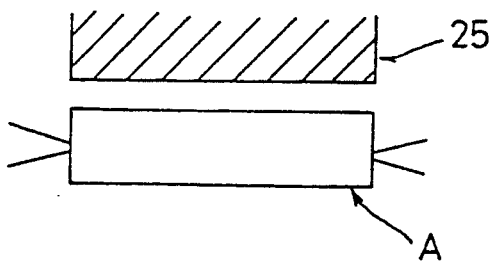
FIG. 17
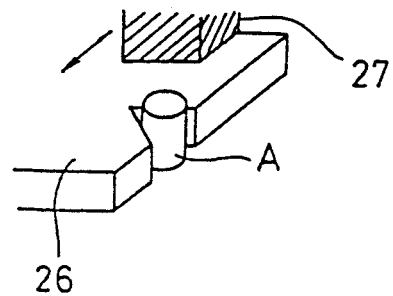

MULTIPLE OPTICAL FIBER CONNECTOR TERMINAL AND METHOD OF MAKING SAME

BACKGROUND OF THE INVENTION

1. Field of the Invention

The present invention relates to multiple optical fiber connector terminals for closely connecting cords or cables of optical fibers within an adapter for communications systems, data transmission systems, and other optical systems.

2. Description of the Prior Art

In optical fiber transmission lines, the connection between optical fibers is critical. The connection of optical fibers requires a precise registration of optical fibers. Optical fibers are made from glass and have a diameter of 100 microns. There are two requirements for the connector terminals; protecting and reinforcing the optical fibers and registering optical fibers with high-precisions in the order of micrometers.

In an attempt to satisfy such requirements, an optical fiber connector terminal such as shown in FIG. 24 has been proposed. This connector terminal includes a terminal body 40 which is made from zirconia ceramic. The terminal body 40 is made by molding a terminal body which is slightly larger than the finished product, sintering it at high temperatures, and grinding a receiving aperture 41 with a wrapping wire or the like to the desired size. The terminal body 40 is then press fitted into a support member 42.

However, it is very difficult to make a long core pin of the mold for the receiving aperture 41 so that it is very difficult to make a thin long receiving aperture 41 which is longer than 10 mm. For this reason, the strength of an optical fiber bonded to the conventional receiving aperture 41 is so small that the finished product is not reliable.

The zirconia ceramic materials require sintering at high temperatures, making the manufacturing process complex and difficult, resulting in the low yield. In addition, thin connector terminals between 1.0 and 1.5 mm in diameter have low bending resistance and are easy to break upon connection and disconnection.

Even if the connector terminal is made from a metal, it is extremely difficult to make a thin long receiving aperture in the connector terminal. Moreover, the terminal body 40 and the support member 42, which are made from different materials, are not compatible and can break upon forcible connection.

To make a multiple optical fiber connector terminal, it is necessary to use simultaneously a plurality of core pins for molding receiving apertures for the multiple optical fibers, which can causes uneven mixtures of ceramic powders, producing nests or break the molding core pins, making the molding itself impossible.

SUMMARY OF THE INVENTION

Accordingly, it is an object of the invention to provide an optical fiber connector terminal having a plurality of thin long apertures in which a plurality of optical fibers are bonded, thereby providing a reliable optical fiber connector terminal.

It is another object of the invention to provide a method of making such an optical fiber connector terminal as described above.

According to an aspect of the invention there is provided an optical fiber connector terminal which includes a sleeve; a plurality of pins disposed equidistance from a center within the sleeve to form a receiving aperture; a plurality of filler rods disposed between the sleeve and the pins; and an optical fiber inserted into and bonded to the receiving aperture.

In the above connector terminal, the sleeve, the filler rods, and the pins are integrated so that the pins are fixed to provide a thin long receiving aperture, thereby providing a long connector terminal. This increases the bonding strength of an optical fiber to the receiving aperture and thus the connector reliability.

According to another aspect of the invention there is provided a method of making an optical fiber connector terminal, which includes the steps of placing a plurality of pins and a plurality of filler rods within a sleeve such that the pins are disposed around a center of the sleeve; reducing a diameter of the sleeve so that the filler rods are collapsed to fill spaces between the sleeve and the pins, thereby disposing the pins equidistance from the center to form a receiving aperture at the center; and securing an optical fiber in the receiving aperture to provide an optical fiber connector terminal.

By the above method it is possible to make a connector terminal having a thin long receiving aperture without difficulty.

The above and other objects, features, and advantages of the invention will become more apparent from the following description when taken in conjunction with the accompanying drawings.

BRIEF DESCRIPTION OF THE DRAWINGS

FIGS. 11-13 show a connector terminal material with triangular apertures;

FIG. 14 shows how to cut off end portions of the connector terminal material;

FIG. 15 illustrates how to wrap the triangular aperture to form a circular receiving aperture;

FIG. 16 shows how to grind the circumference of the connector terminal material with a cylindrical grinder;

FIG. 17 illustrates how to polish an end of the connector terminal material;

DESCRIPTION OF THE PREFERRED EMBODIMENT

Figure 1:
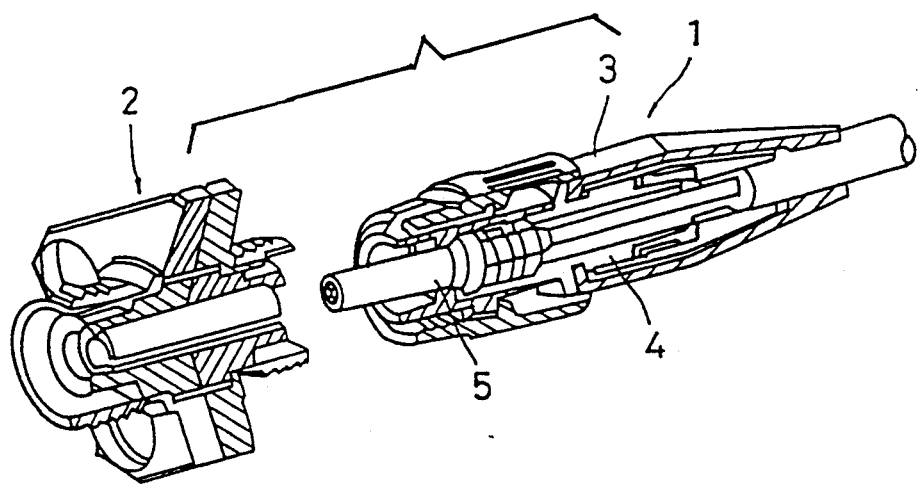
FIG. 1 is a perspective view of a multiple optical fiber connector having a connector terminal according to an embodiment of the invention.
Figure 2:
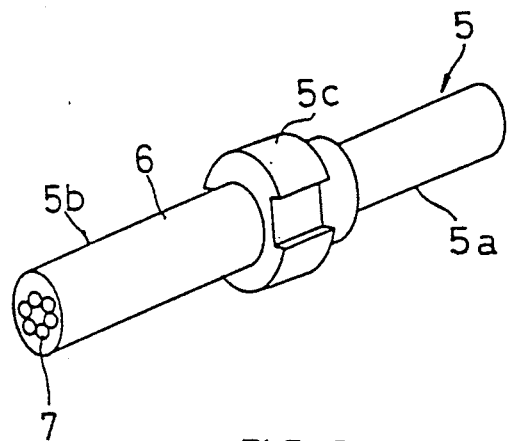
FIG. 2 is a perspective view of the connector terminal of FIG. 1.
Figure 3:
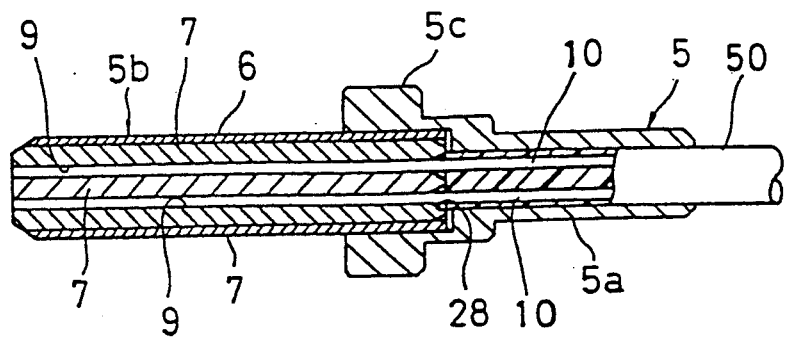
FIG. 3 is a longitudinal section of the connector terminal of FIG. 1.
Figure 4:
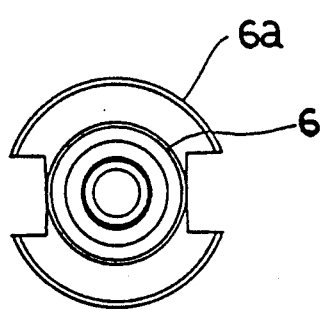
FIG. 4 is a rear view of the connector terminal of FIG. 1.
Figure 5:
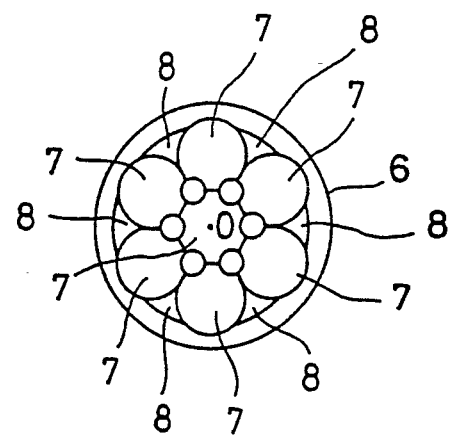
FIG. 5 is a front view of a terminal body of the connector terminal of FIG. 1.

In FIG. 1, the optical fiber connector includes a plug 1 and an adapter 2. The plug 1 has a plug housing 3 for housing a multiple optical fiber connector terminal 5 via a retainer fixture 4.

As FIGS. 2-5 show, the connector terminal 5 consists of a support member 5a with a flange 5c and a terminal body 5b attached to the support member 5a. The terminal body 5b has a sleeve 6 in which seven pins 7 are placed with filler rods 8 filling in spaces between the sleeve 6 and the pins 7. Six optical fibers 10 of a fiber cable 50 are bonded to six receiving apertures 9 each defined by the three adjacent pins 7. The filler rods 8 and the sleeve 6 are subjected to a rotary forging process in a rotary swage, for example, to be reduced in diameter so that the filler rods 8 fills spaces between the sleeve 6 and pins 7, thereby disposing the pins 7 and the optical fibers 10.

As has been described above, the six pins 7 are disposed equidistance from the seventh pin 7 at the center 0 within the sleeve 6 to form six receiving apertures 9 around the center 0. The filler rods 8 are provided in spaces between the sleeve 6 and the pins 7, and the sleeve 6 is reduced in diameter so that the filler rods 8 fill spaces between the sleeve 6 and the pins 7, and the optical fibers 10 are bonded into the receiving apertures 9. As a result, the sleeve 6, the filler rods 8, and the pins 7 are integrated to hold the pins 7 in place, thereby forming thin long apertures 9. This makes it possible to make a long connector terminal. Consequently, the bonding strength of the optical fibers 10 to the receiving apertures 9 is increased, resulting in the increased connector reliability.

A method of making such an optical fiber connector terminal 5 will be described below with reference to FIGS. 6-21.

Figure 6:
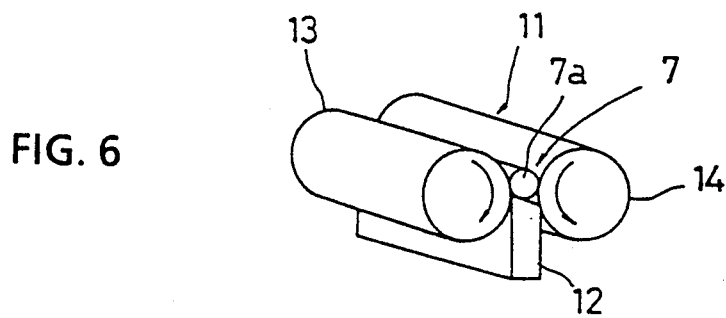
FIG. 6 is a perspective view showing how to grind a pin for making the connector terminal of FIG. 1.

In FIG. 6, a pin material 7a of stainless steel is cut to a predetermined length (for example, 60 mm), subjected to a heat treatment or hardening process, and ground in a grinder 11 to form a pin 7 which has a predetermined degree of circularity and a predetermined degree of surface smoothness. The grinder 11 consists of a support member 12 for supporting the pin material 7a and a pair of grinding rollers 13 and 14, which rotate in opposite directions shown by arrows to grind the pin material 7a. Thus, the pin 7 is made from a hardened stainless steel material (for example, SUS 305).

Figure 7:
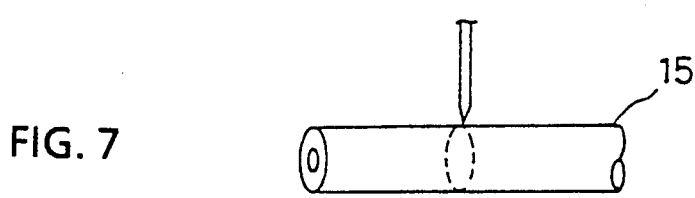
FIG. 7 shows how to cut a pipe for making a sleeve for the connector terminal of FIG. 1.

In FIG. 7, in order to make a sleeve 6, a stainless steel pipe 15 is cut to a predetermined length.

Figure 8:
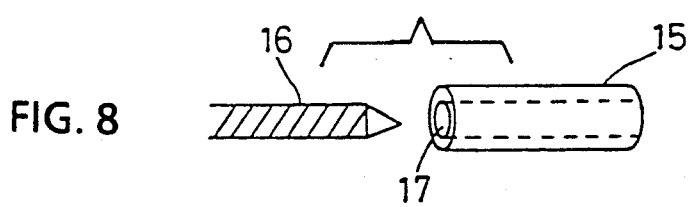
FIG. 8 shows how to make a specified inner diameter in the sleeve of FIG. 7.

In FIG. 8, an opening 17 of a specified inner diameter is made with a drill 16 or the like. Unlike the pin 7, the resulting sleeve 6 is made from stainless steel which is not hardened so that its hardness is less than that of the pin 7.

Figures 9, 10:
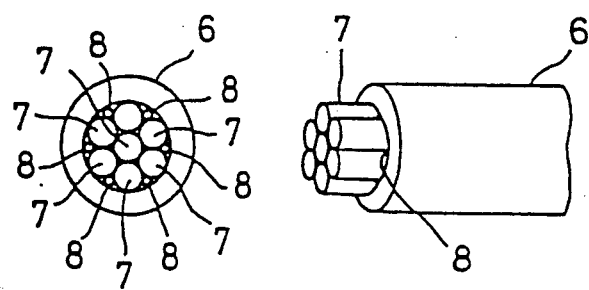
FIGS. 9 and 10 show seven pins and six filler rods placed in the sleeve.

In FIGS. 9 and 10, six pins 7 and six filler rods 8 are alternatingly disposed around the seventh pin 7 which is disposed at the center of the sleeve 6. The filler rods 8 having a circular or fan shaped cross section are made from stainless steel which is not hardened. Consequently, their hardness is substantially equal to that of the sleeve 6 and less than that of the pins 7.

In FIGS. 11-13, the sleeve 6 having the seven pins 7 and the six filler rods 8 therein is subjected to a rotary forging process, for example, in a rotary swage to reduce the diameter. The rotary forging process is a process by which the sleeve 6 is struck by one or two pairs of forging dies under continuous or intermittent rotation about its axis, thereby forming a connector terminal material A. The rotary forging process makes the filler rods 8 collapse to fill spaces between the sleeve 6 and the pins 7, thereby disposing the six pins 7 equidistance from the seventh pin 7 at the center 0. As a result, each of six triangular apertures 20 is formed by every three adjacent pins 7.

In FIG. 14, opposite end portions of the connector terminal material A are cut off with a pair of fine cutters 19. The cutting surfaces are smoothed and cleaned.

In FIG. 15, a wrapping wire 21 is put through each triangle aperture 20. Grinding diamond granules 22 are put on the wrapping wire 21. A pair of reels 23 and 24 are turned back and forth to reciprocate the wrapping wire 21 to grind the wall of the receiving aperture 20, thereby forming a receiving aperture 9 which has a circular cross section.

In FIG. 16, the outside of the connector terminal material A is polished with a cylindrical grinder 25 to provide the desired degree of concentricity.

In FIG. 17, an end surface of the terminal material A is polished with a grinder 27 while being held in place with a holder 26 to provide a right angled end surface.

Figure 18:
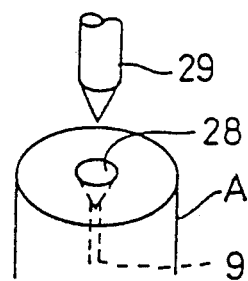
FIG. 18 shows how to make a guide surface in the receiving aperture.

In FIG. 18, a guiding surface 28 is made at an end of the receiving aperture 9 by an electric discharge process using an electrode 29. Alternatively, the guiding surface 28 may be made by a cutting process.

Figure 19:
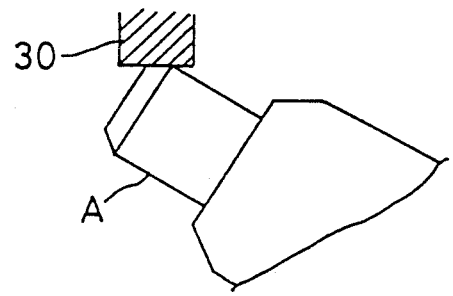
FIG. 19 illustrates how to round a corner of the connector terminal material.

In FIG. 19, an end of the terminal material A is ground with a grinder 30 to provide a rounded corner. The terminal material A is then cleaned and press fitted into a support member 5a for integration.

Figure 20:
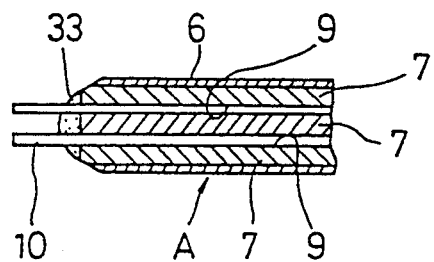
FIG. 20 is a longitudinal section of the connector terminal material into which a plurality of optical fiber are inserted and bonded.

In FIG. 20, an adhesive 33 is put in the receiving apertures 9, and optical fibers 10 are put through the receiving apertures 9, thereby building up the adhesive 33 at the end surface so that the projected portions of the optical fibers 10 are also bonded. The built up adhesive 33 and the projected optical fibers 10 are ground off with a grinder to provide a connector terminal 5.

Figure 22:
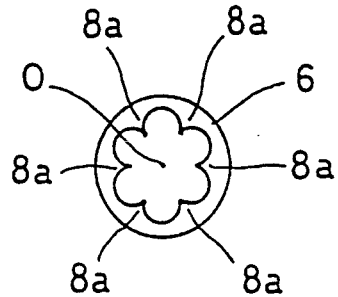
Figure 23:
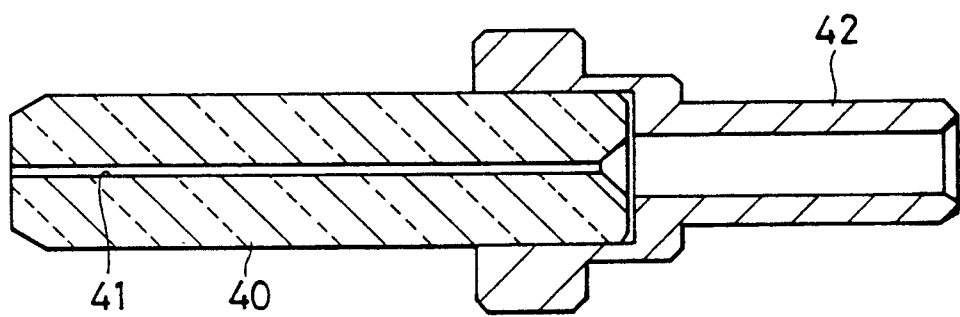
FIG. 23 is a longitudinal section of a conventional connector terminal.

FIGS. 22 and 23 show another embodiment of the invention, wherein six inner ridges 8a are made on the inside of the sleeve 6 such that they fill spaces between the pins 7 and the sleeve 6, forming six receiving apertures 9. Six optical fiber 10 are inserted and bonded in the receiving aperture 9 defined by the seven pins 7. The inner ridges 8a and the sleeve 6 are subjected to a rotary forging in a rotary swage, for example, so that the inner ridges 8a fill spaces between the sleeve 6 and the pins 7 to dispose the six pins 7 equidistance from the seventh pin 7 at the center 0, thereby defining the six receiving apertures 9 around the center 0.

Figure 21:
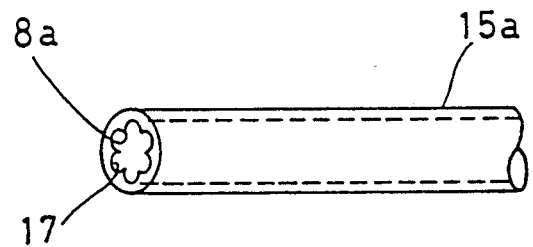
FIGS. 21 and 22 show how to make a sleeve for a multiple optical fiber connector terminal according to another embodiment of the invention.

In FIG. 21, a sleeve material 15a with six inner ridges 8a is made by a drawing process and cut to a predetermined length.

In FIG. 22, a specified inner opening 17 is defined, and a circumferential surface of the sleeve material 15a is machined to provide a sleeve 6 which has the desired degree of concentricity.

Six pins 7 are placed between the inner ridges 8a, with one at the center 0. The sleeve 6 is then subjected to a rotary forging process in the same way as described above.

Alternatively, the sleeve 6 and the filler rods 8 made from stainless steel which is not hardened may be made from tungsten or beryllium as far as their hardness is less than that of the pins 7 which are made from hardened stainless steel such as SUS 305. The sleeve 6 having the pins 7 and the filler rods 8 were reduced in diameter by a rotary forging in a rotary swage in the above embodiment, but the same results may be obtained by a drawing or press machine.

As has been described above, the multiple optical fiber connector terminal according to the invention does not require any metal mold for the manufacture. The sleeve and the pins are integrated to form a plurality of thin long receiving apertures without the possibility that the grinding granules enter spaces between the sleeve and the pins. Thus, the bonding strength of optical fibers to the thin long receiving apertures is increased, resulting in the increased connector reliability. The multiple optical fiber connector terminal according to the invention also makes the manufacture simple, resulting the reduced manufacturing costs by volume production.

With the multiple optical fiber connector terminal according to the invention it is possible to make a compact multiple optical fiber connector terminal having a plurality of thin long receiving apertures without using any molding core pins. In addition, the sleeve is made from the same material as that of the support member so that it is easy to press fit the connector terminal into the support member. Also, it is possible to solder or weld the connector terminal to the support member, thereby increasing the connector reliability and decreasing the manufacturing costs.

We claim:

1. A multiple optical fiber connector terminal comprising:
    a sleeve made from a steel;
    at least four pins made from a steel and disposed within said sleeve so that adjacent pins define at least three receiving apertures;
    at least three filler members disposed between said sleeve and said pins for collapsing to closely fill spaces between said sleeve and said pins when said sleeve is reduced in diameter; and
    at least three optical fibers each inserted into and bonded to said receiving apertures.

2. The multiple optical fiber connector terminal of claim 1, wherein said plurality of filler members are filler rods having a circular cross section.

3. The multiple optical fiber connector terminal of claim 1, wherein said plurality of filler members are filler rods having a triangular cross section.

4. The multiple optical fiber connector terminal of claim 1, wherein said filler members are filler rods having a polygonal cross section.

5. The multiple optical fiber connector terminal of claim 1, wherein said sleeve and said filler members have a hardness less than that of said pins.

6. The multiple optical fiber connector terminal of claim 1, wherein said pins are made from hardened stainless steel while said sleeve and said filler members are made from stainless steel which is not hardened.

7. A multiple optical fiber connector terminal comprising:
    a sleeve made from a steel;
    at least four pins disposed within said sleeve, with one in the center, so that adjacent pins define at least three receiving apertures;
    at least three optical fibers each inserted into and bonded to said receiving apertures; and
    said sleeve being reduced in diameter so that deformed material of said sleeve closely fills spaces between said sleeve and said pins.

8. The multiple optical fiber connector terminal of claim 7, wherein said sleeve has a hardness less than that of said pins.

9. The multiple optical fiber connector terminal of claim 7, wherein said pins are made from hardened stainless steel while said sleeve is made from stainless steel which is not hardened.

10. A multiple optical fiber connector terminal comprising:
    a sleeve made from a steel provided with at least three inner ridges extending toward a center of said sleeve;
    at least four pins disposed between said inner ridges within said sleeve, with one at a center of said sleeve, so that adjacent pins define at least three receiving apertures;
    at least three inner ridges extending inwardly from said sleeve and collapsing to closely fill spaces between said sleeve and said pins; and
    a plurality of optical fibers each inserted into and bonded to said receiving apertures.

11. The multiple optical fiber connector terminal of claim 10, wherein said sleeve has a hardness less than that of said pins.

12. The multiple optical fiber connector terminal of claim 10, wherein said pins are made from hardened stainless steel while said sleeve is made from stainless steel which is not hardened.

13. A method of making a multiple optical fiber connector terminal, which comprises the steps of:
    placing at least four pins, with one at a center of a sleeve made from a steel, and at least three filler members within said sleeve such that adjacent pins define at least three receiving apertures;
    reducing a diameter of said sleeve so that said filler members fill spaces between said sleeve and said pins, thereby disposing said pins and defining said receiving apertures; and
    securing at least three optical fibers in said receiving apertures to provide a multiple optical fiber connector terminal.

14. The method of claim 13, wherein said filler member are filler rods having a circular cross section.

15. The method of claim 13, wherein said filler member are filler rods having a triangular cross section.

16. The method of claim 13, wherein said filler member having a polygonal cross section.

17. The method of claim 13, wherein said pins are made from hardened stainless steel while said sleeve and said filler member are made from stainless steel which is not hardened.

18. The method of claim 13, wherein said diameter reducing step comprises the step of subjecting said sleeve with said filler members to a rotary forging process.

19. The method of claim 13, wherein said diameter reducing step comprises the step of subjecting said sleeve with said filler members to a drawing process.

20. The method of claim 13, wherein said diameter reducing step comprises the step of subjecting said sleeve with said filler members to a press process.

21. A method of making a multiple optical fiber connector terminal, which comprises the steps of;

placing at least four pins within a sleeve made from a steel, with one at a center of said sleeve, such that adjacent pins define at least three receiving apertures, said pins having a hardness greater than that of said sleeve;

reducing a diameter of said sleeve so that deformed materials of said sleeve closely fill spaces between said sleeve and said pins, thereby disposing said pins and defining said receiving apertures; and securing at least three optical fibers in said receiving apertures to provide a multiple optical fiber connector terminal.

22. The method of claim 21, wherein said pins are made from hardened stainless steel while said sleeve and said filler member are made from stainless steel which is not hardened.

23. The method of claim 21, wherein said diameter reducing step comprises the step of subjecting said sleeve with said filler members to a rotary forging process.

24. The method of claim 21, wherein said diameter reducing step comprises the step of subjecting said sleeve with said filler members to a drawing process.

25. The method of claim 21, wherein said diameter reducing step comprises the step of subjecting said sleeve with said filler members to a press process.

26. A method of making a multiple optical fiber connector terminal, which comprises the steps of:

providing a sleeve with at least three inner ridges extending toward a center of said sleeve;

placing at least four pins within said sleeve, with one at a center of said sleeve, such that adjacent pins define at least three receiving apertures, said pins having a hardness greater than that of said sleeve;

reducing a diameter of said sleeve so that said inner ridges closely fill spaces between said sleeve and said pins, thereby disposing said pins and defining said receiving apertures; and securing at least three optical fibers in said receiving apertures to provide a multiple optical fiber connector terminal.

27. The method of claim 26, wherein said pins are made from hardened stainless steel while said sleeve is made from stainless steel which is not hardened.

28. The method of claim 26, wherein said diameter reducing step comprises the step of subjecting said sleeve with said inner ridges to a rotary forging process.

29. The method of claim 26, wherein said diameter reducing step comprises the step of subjecting said sleeve with said inner ridges to a drawing process.

30. The method of claim 26, wherein said diameter reducing step comprises the step of subjecting said sleeve with inner ridges to a press process.

* * * * *